(12) United States Patent
Goldberg et al.

(10) Patent No.: US 10,917,468 B2
(45) Date of Patent: *Feb. 9, 2021

(54) SYSTEMS AND METHODS OF RE-ASSOCIATING CONTENT ITEMS

(71) Applicant: Dropbox, Inc., San Francisco, CA (US)

(72) Inventors: Isaac Goldberg, San Francisco, CA (US); Arthur Kopatsy, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 16/222,208

(22) Filed: Dec. 17, 2018

(65) Prior Publication Data

US 2019/0124149 A1 Apr. 25, 2019

Related U.S. Application Data

(63) Continuation of application No. 14/979,400, filed on Dec. 27, 2015, now Pat. No. 10,187,464.

(51) Int. Cl.
*G06F 17/00* (2019.01)
*H04L 29/08* (2006.01)
*G06F 16/27* (2019.01)

(52) U.S. Cl.
CPC .......... *H04L 67/1095* (2013.01); *G06F 16/27* (2019.01); *H04L 67/1097* (2013.01); *H04L 67/306* (2013.01)

(58) Field of Classification Search
None
See application file for complete search history.

(56) References Cited

U.S. PATENT DOCUMENTS

| | | | |
|---|---|---|---|
| 8,332,357 B1 * | 12/2012 | Chung | G06F 17/30174 707/634 |
| 8,527,986 B1 * | 9/2013 | Mojica | G06F 8/65 717/178 |
| 8,543,543 B2 | 9/2013 | Marcelais et al. | |
| 8,572,022 B2 | 10/2013 | Hagan et al. | |
| 8,868,500 B2 | 10/2014 | Giampaolo et al. | |
| 9,448,704 B1 * | 9/2016 | Belhumeur | G06F 3/04842 |
| 10,102,388 B2 * | 10/2018 | Zhang | G06F 21/6245 |
| 2006/0062426 A1 | 3/2006 | Levy et al. | |
| 2007/0226807 A1 | 9/2007 | Ginter et al. | |

(Continued)

*Primary Examiner* — Hasanul Mobin
(74) *Attorney, Agent, or Firm* — Polsinelli PC

(57) ABSTRACT

Disclosed are systems, methods, and non-transitory computer-readable storage media for re-associating content items of a user account of a content management system on a computing device relinked to the content management system. The systems, methods, and non-transitory computer-readable storage media can include the content management system receiving a request to relink the computing device with a user account of the content management system. The systems, methods, and non-transitory computer-readable storage media can also include determining a local content item of the client device corresponds to at least one revision of a plurality of revisions of a content item of the user account, wherein the content item is currently removed from the user account. Finally, the systems, methods, and non-transitory computer-readable storage media can cause the client device to delete the local content item.

20 Claims, 11 Drawing Sheets

(56) References Cited

U.S. PATENT DOCUMENTS

| | | | |
|---|---|---|---|
| 2007/0276823 A1* | 11/2007 | Borden | H04L 9/3239 |
| 2011/0218964 A1* | 9/2011 | Hagan | G06F 16/178 |
| | | | 707/626 |
| 2011/0231819 A1* | 9/2011 | Tanner | G06Q 30/02 |
| | | | 717/123 |
| 2012/0089669 A1 | 4/2012 | Berg et al. | |
| 2013/0179398 A1 | 7/2013 | Liao et al. | |
| 2014/0122447 A1* | 5/2014 | Hunter | G06F 17/30097 |
| | | | 707/692 |
| 2014/0181198 A1* | 6/2014 | Motes | H04L 67/104 |
| | | | 709/204 |
| 2014/0222758 A1 | 8/2014 | March et al. | |
| 2015/0163206 A1 | 6/2015 | McCarthy et al. | |
| 2015/0178516 A1* | 6/2015 | Mityagin | G06F 21/6218 |
| | | | 707/783 |
| 2015/0254441 A1* | 9/2015 | Sanso | G06F 21/41 |
| | | | 726/9 |
| 2015/0347996 A1* | 12/2015 | Alsina | G06Q 20/29 |
| | | | 705/44 |
| 2015/0350220 A1* | 12/2015 | Espinosa | H04L 63/102 |
| | | | 726/28 |
| 2015/0350221 A1* | 12/2015 | Espinosa | H04L 63/102 |
| | | | 705/44 |
| 2016/0050177 A1* | 2/2016 | Cue | G06Q 10/10 |
| | | | 709/206 |
| 2016/0255088 A1* | 9/2016 | Kaplan | H04L 63/08 |
| | | | 726/7 |

* cited by examiner

SYSTEMS AND METHODS OF RE-ASSOCIATING CONTENT ITEMS

CROSS REFERENCE TO RELATED APPLICATION

This application is a continuation of U.S. patent application Ser. No. 14/979,400, entitled "SYSTEMS AND METHODS OF RE-ASSOCIATING CONTENT ITEMS", filed on Dec. 27, 2015, now allowed; which is hereby expressly incorporated herein by reference in its entirety.

TECHNICAL FIELD

The present technology pertains to relinking a user account on a computing device with a content management system, and more specifically pertains to re-associating content items of the user account on the computing device.

BACKGROUND

Content stored in an online storage account associated with a content management system can be accessed on computing devices in a variety of ways, such as through a stand-alone application, one or more application plug-ins, a web browser, etc. Users can upload content items, such as pictures, songs, documents, folders, etc., from a computing device to their online storage account and later access the content items from different computing devices. The content management system can store revision histories of each of the content items associated with a user account. The revision histories can facilitate synchronization of the content between multiple computing devices associated with the user account.

In some situations, users may want to unlink their computing devices from the content management system, such as if the users misplace or lose their devices or intend to resell or give away their devices. A content management system, such as the system provided by Dropbox Inc. of San Francisco, Calif., can unlink a user account on a specified computing device such that local content items on the device no longer synchronize with the content management system. On certain user accounts, the content management system can leave the local content items on the computing device when unlinking the user account. On other types of user accounts, the content management system can remotely wipe or delete the local content items from the computing device or leave the local content items on the device depending on user selection. Occasionally users may relocate their computing devices or change their minds about reselling or giving away their devices, and desire to relink their user accounts on unlinked devices. The content management system can also support this functionality. However, for those computing devices that retain local content items, potential conflicts can arise. For example, a computing device may store an outdated revision of a local content item if the content item was updated during a time the computing device was unlinked. As another example, the local content item may include updates during the time the computing device was unlinked and those updates would not have been synchronized by the content management system. As yet another example, the content item may be deleted, renamed, or moved during this time. Systems and methods may be necessary to handle such situations.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for re-associating content items of a client device relinked to a content management system, including re-associating content items that have been removed during a time the client device was unlinked. The systems, methods, and non-transitory computer-readable storage media can include a content management system receiving a request to relink the client device with a user account of the content management. The systems, methods, and non-transitory computer-readable storage media can also include determining the local content item of the client device corresponds to a revision of a content item of the user account, wherein the content item is currently removed from the user account. Finally, the systems, methods, and non-transitory computer-readable storage media can include causing the client device to delete the local content item from the client device.

The systems, methods, and non-transitory computer-readable storage media can further include determining a signature of the local content item and comparing the signature of the local content item to a signature of the revision. In some examples, the signature of the local content item can include a hash value of the local content item. In some examples, the signature of the local content item can also include a content path of the local content item, such as a folder hierarchy of the content item and a name of the local content item.

The systems, methods, and non-transitory computer-readable storage media can further include determining the client device further includes a second local content item that does not correspond to any revisions of a second content item of the user account and receiving the second local content item from the client device.

The systems, methods, and non-transitory computer-readable storage media can further include determining the client device further includes a third local content item that corresponds to a previous revision of a third content item of the user account, wherein the third content item is not currently removed, and sending data for synchronizing the third local content item.

Finally, the systems, methods, and non-transitory computer-readable storage media can include the content management system receiving a request to unlink the client device from the content management system and also receiving from a second client device authorized on the user account, a request to delete the local content item.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations can be used without parting from the spirit and scope of the disclosure.

The disclosed technology addresses the need in the art for re-associating content items of a user account of a content management system with a client device. Multiple client devices can be authorized by the user account. The content management system can synchronize the content items among the multiple client devices. The content management system can unlink the user account from a client device and then subsequently relink the client device to the user account. During relinking, the content management system can synchronize the content items on the client device, such as by updating older revisions of content items on the client device, receiving new content items from the client device, and propagating deleted, renamed, or moved content items to the client device.

During a time the client device is unlinked, one or more content items of the content management system can be deleted, renamed, and/or moved. These updates are not reflected in local content items on the client device because the content management ceases to synchronize with the client device during this time. A conventional content management system can erroneously recognize the outdated revisions of the local content items on the client device as new items and distribute the outdated revisions to other client devices authorized by the user account.

Figure 1A:
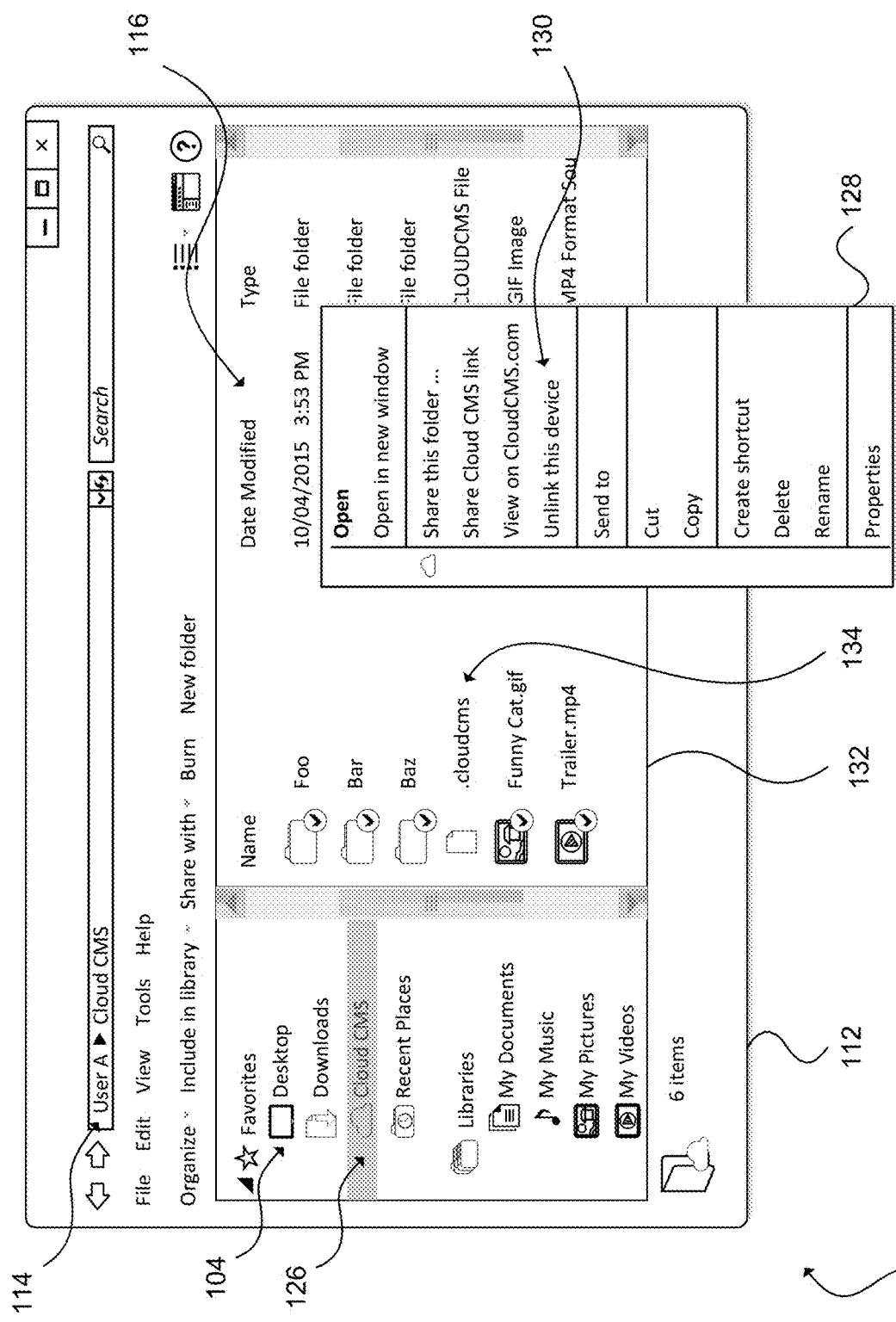
FIGS. 1A, 1B, and 1C show an example client application for un-associating local content items on a client device from content items of a content management system and re-associating the local content items on the client device to the content items of the content management system.
Figure 6:
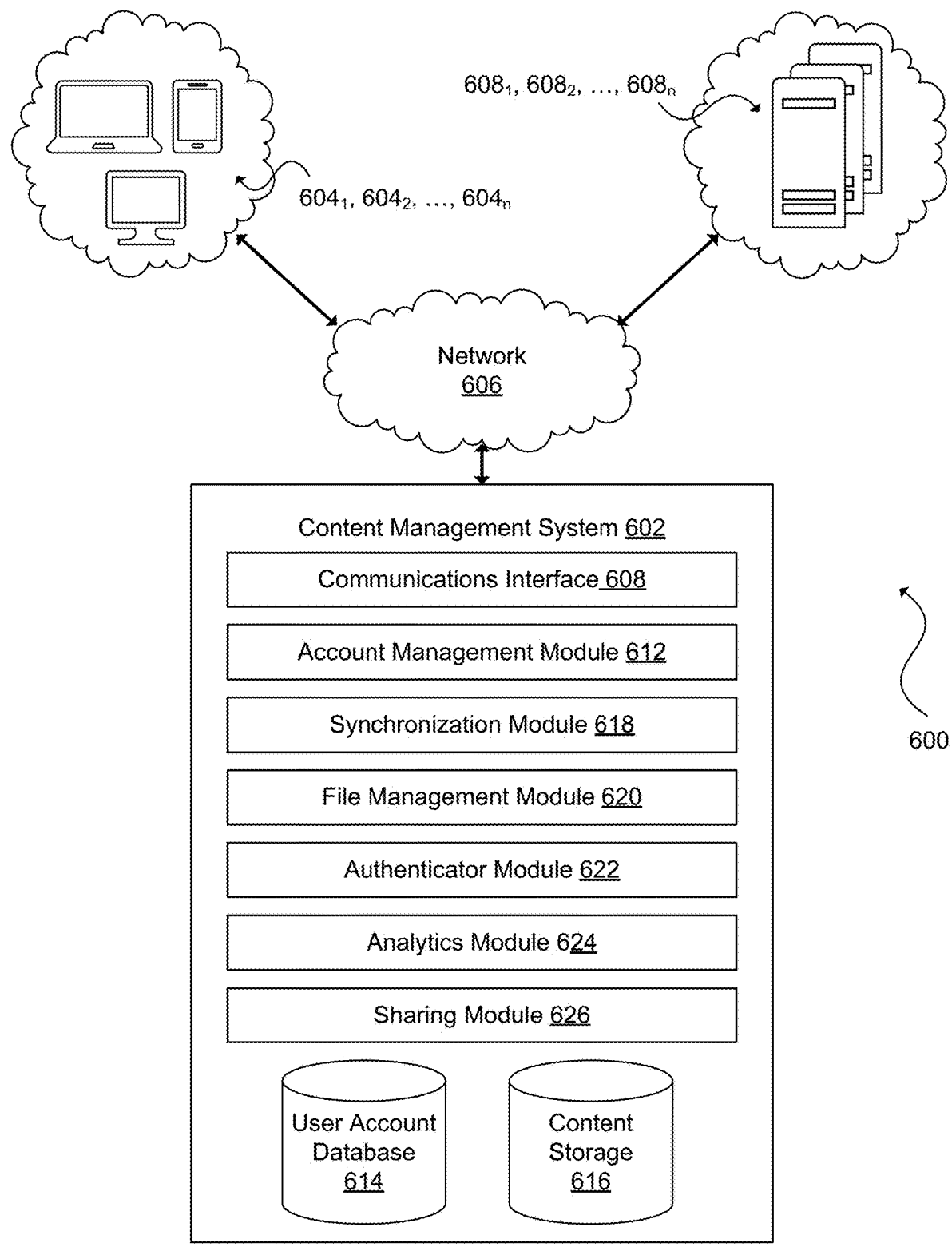
FIG. 6 shows an example configuration of devices and a network in accordance with various embodiments of the present technology.

FIG. 1A shows an example client application interface 100 for unlinking client device 104 from a content management system (e.g., content management system 602 of FIG. 6). Client application interface 100 can be a part of client application 112 installed on client device 104 to interact with the content management system. Client application 112 can be integrated into a file system of client device 104 or can be implemented as a stand-alone application. In the example of FIG. 1A, user 114 (i.e., User A) of a user account associated with the content management system operates client application 112 on client device 104, the user's desktop computer. Client application 112 can include detail pane 132 that lists local content items 116 on client device 104. Detail pane 132 can also list local metadata file 134 to facilitate interaction between client device 104 and the content management system. As shown in FIG. 1A, user 114 has right-clicked on application icon 126 representing client application 112 (or right-clicked on details pane 132) to pull up context menu 128. Context menu 128 can include menu options for various functionality provided by the content management system, including menu option 130 for "unlinking" (e.g., uninstalling a client application and disassociating local content items of a user account from a content management system) client device 104 from the content management system.

Figure 1B:
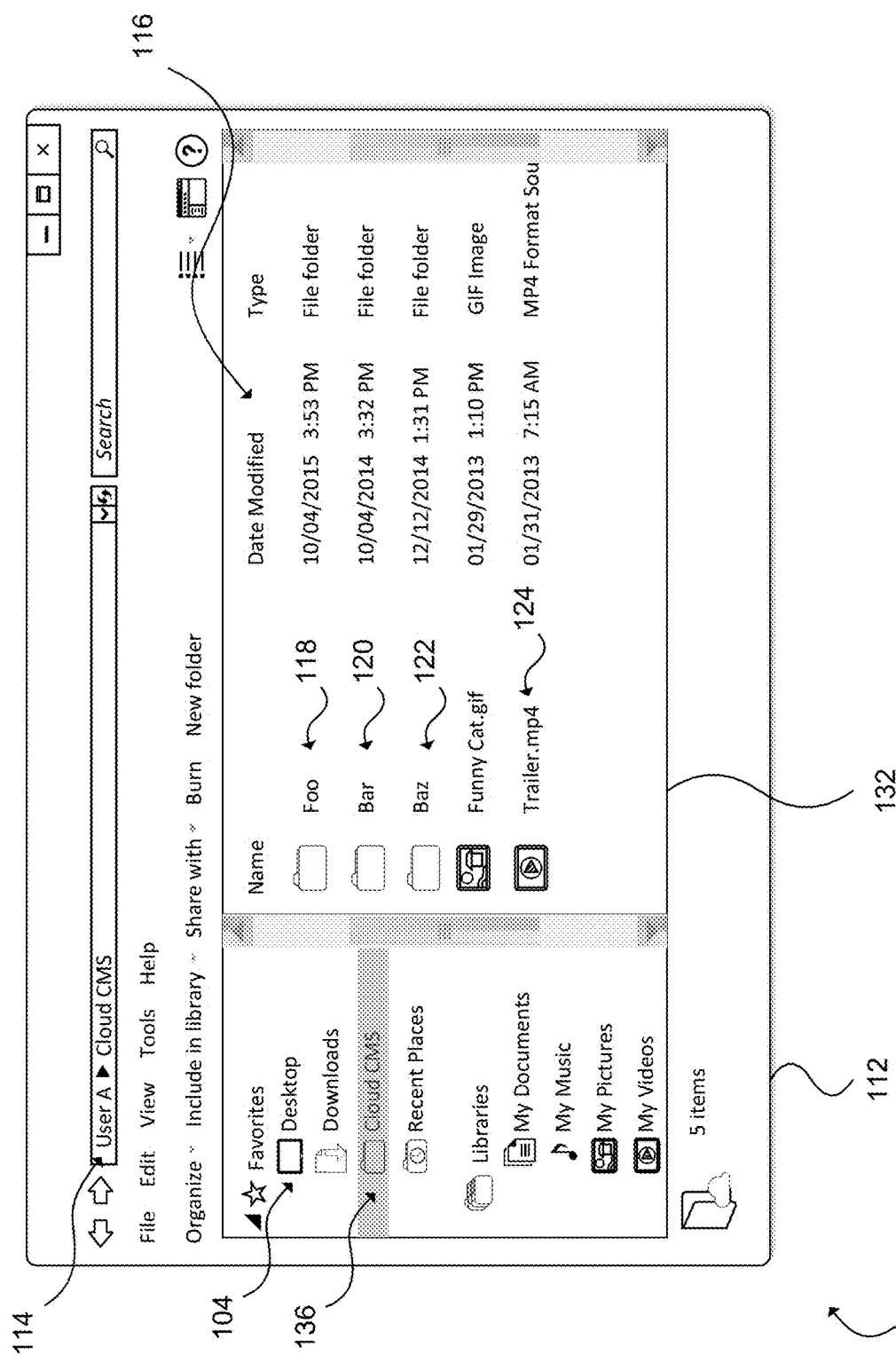

FIG. 1B shows an example client application interface 125 of unlinked client device 104. After user 114 selects menu option 130 for "unlinking" client device 104 from the content management system and confirms unlinking client device 104 from the content management system, client device 104 can delete client application 112 and any metadata associated with client application 112. For example, as shown in FIG. 1B, client device 104 has replaced application icon 126 (as previously shown in FIG. 1A) representing client application 112 with folder icon 136 representing local content items 116 on client device 104 and deleted local metadata file 134 to indicate the unlinked state of client device 104. In addition, when client device 104 is unlinked, client device 104 may no longer synchronize with the content management system. For example, local directory 118 (i.e., Foo), local directory 120 (i.e., Bar), local directory 122 (i.e., Baz), and local content item 124 (i.e., Trailer.mp4) may no longer display synchronization state icons (as previously shown in FIG. 1A) to indicate that these local content items are no longer synchronized with the content management system. That is, client device 104 will not receive updates (e.g., deletes, renames, moves, modifications, creations, etc.) for these local content items by other client devices associated with the user account of user 114.

Figure 1C:
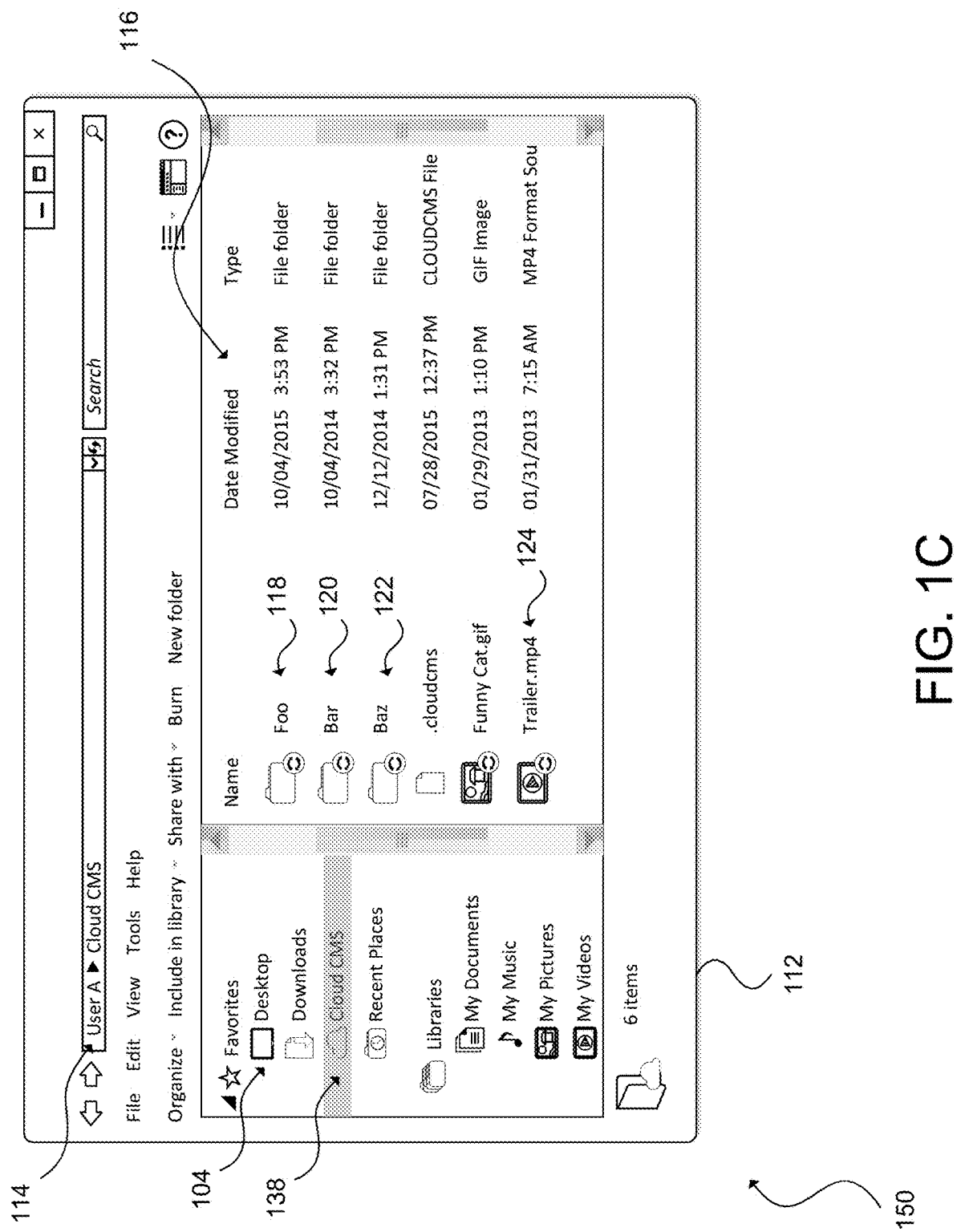

FIG. 1C shows an example client application interface 150 of client device 104 "relinked" to the content management system. For example, user 114 can re-install client application 112 on client device 104 and authenticate user 114 via client application 112. As can be seen in FIG. 1C, upon relinking client device 104 with the content management system, client device 104 has replaced folder icon 136 (as previously shown in FIG. 1B) representing local content items 116 on client device 104 with application icon 138 representing client application 112. Further, client device 104 begins displaying synchronization statuses (e.g., synchronization in progress) for local directory 118 (i.e., Foo), local directory 120 (i.e., Bar), local directory 122 (i.e., Baz), and local content item 124 (i.e., Trailer.mp4). These user interface changes can indicate that client device 104 has relinked with the content management system, and that the local content items will be synchronized with the content management system.

During the period client device 104 is unlinked, user 114 or other authorized users of the user account can add, update, or remove (e.g., delete, move, or rename) content items. Since client device 104 has been "unlinked" from the content management system, the synchronization process will not update client device 104 with these changes. Thus, relinking client device 104 with the content management system can create conflicts between content items of the user account and local content items 116 on client device 104. For example, when client device 104 is relinked, local content items 116 may not reflect the latest updates of content items of the user account and/or the content items that the content management system has removed from the user account may still exist as local content items 116 on client device 104. During synchronization with relinked client device 104, a conventional content management system may determine that unremoved local content items on client device 104 are new content items or updated content items that should be added back to the user account. The conventional content management system will therefore rewrite (i.e., synchronize) removed content items to the user account and distribute these content items to every other client device authorized by the user account even though it is the intention of user 114 or other authorized users to remove these content items. Thus, the conventional content management system would require user 114 or other authorized users to take additional, unnecessary steps to delete, move, or rename previously removed content items.

Figure 2A:
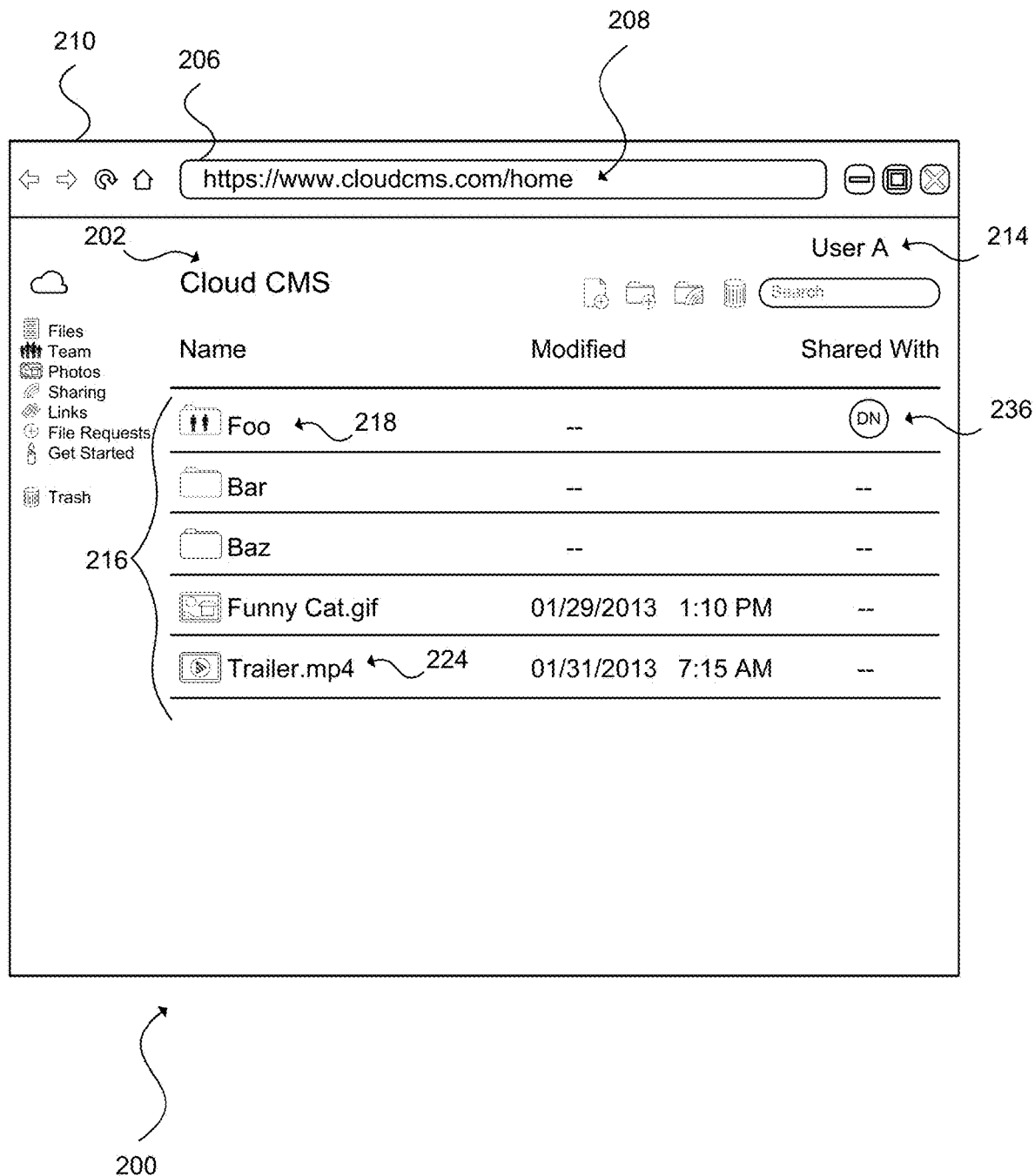
FIGS. 2A and 2B show an example web interface for deleting a content item of a content management system.

FIG. 2A shows an example web interface 200 for a user account of content management system 202 (e.g., content management system 602 of FIG. 6) associated with user 214. Web interface 200 can be provided by content management system 202. Web interface 200 can be rendered and displayed using browsing application. Browsing application 210 can be an application operating on a client device that can be used to navigate content distributed throughout a WAN, such as the Internet. In the example of FIG. 2A, browsing application 210 can parse a document including mark-up language (e.g., HTML, XML) that is served by a web server in the WAN to display multimedia content, such as text, images, audio, video, applications, etc. Browsing application 210 can include an address bar 206 (also referred to as a location bar, URL bar, etc.) for displaying web address 208 toward which user 214 can be navigating, browsing, or otherwise interacting. In the example of FIG. 2A, user 214 has logged on or signed into her user account provided by content management system 202. Browsing application 210 can provide a default (e.g., initial, home, etc.) webpage for user 214 at web address 208 (i.e., "https://www.cloudcms.com/home"). Web interface 200 can include a list of content items 216 of the user account maintained by content management system 202. In particular, list of content items 216 includes a directory (e.g., default directory, root directory, top-most directory, etc.) of content that is associated with the user account of user 214. Content items 216 can include directories, sub-directories, files, albums, playlists, media, and/or other data. Content items 216 can also include shared content items, such as content item 218 (i.e., Foo). For example, other users 236 (e.g., User DN) can access content item 218. The access to content item 218 can be read-only or read/write.

Figure 2B:
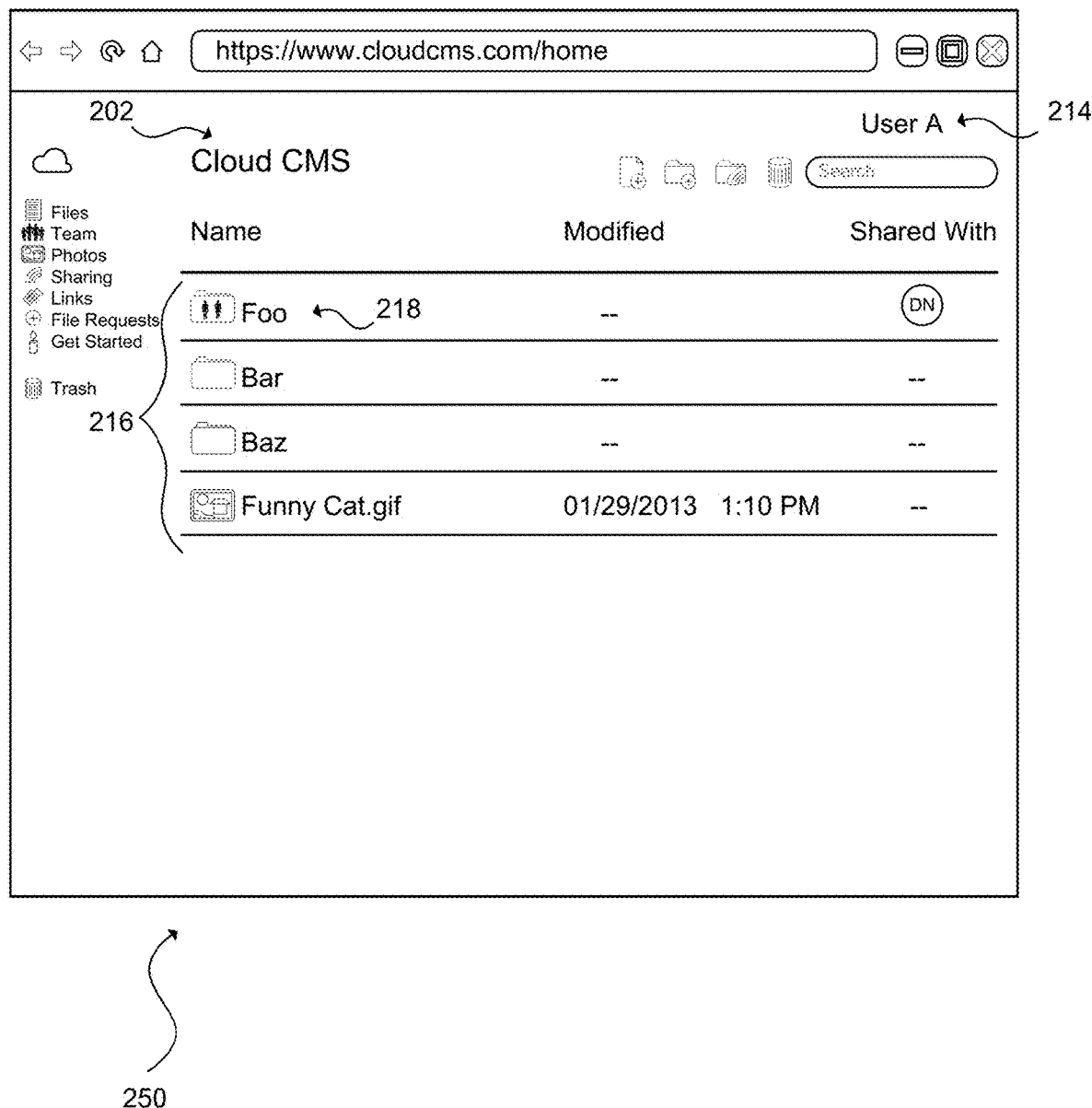

FIG. 2B shows an example web interface 250. User 214 or another authorized user of the user account has removed (e.g., deleted, renamed, moved, etc.) content item 224 (i.e., Trailers.mp4 as previously shown in FIG. 2A). In other examples, a content item can be renamed or moved into a different directory, and content management system 202 can treat such actions as equivalent to deleting the content item from the user account and adding the content item to a new content path. The content management system will remove content item 224 from every other linked client device and client device authorized by the user account of user 214. The content management system will not synchronize with unlinked devices, such as client device 104 as previously shown in FIG. 1B.

Figure 3:
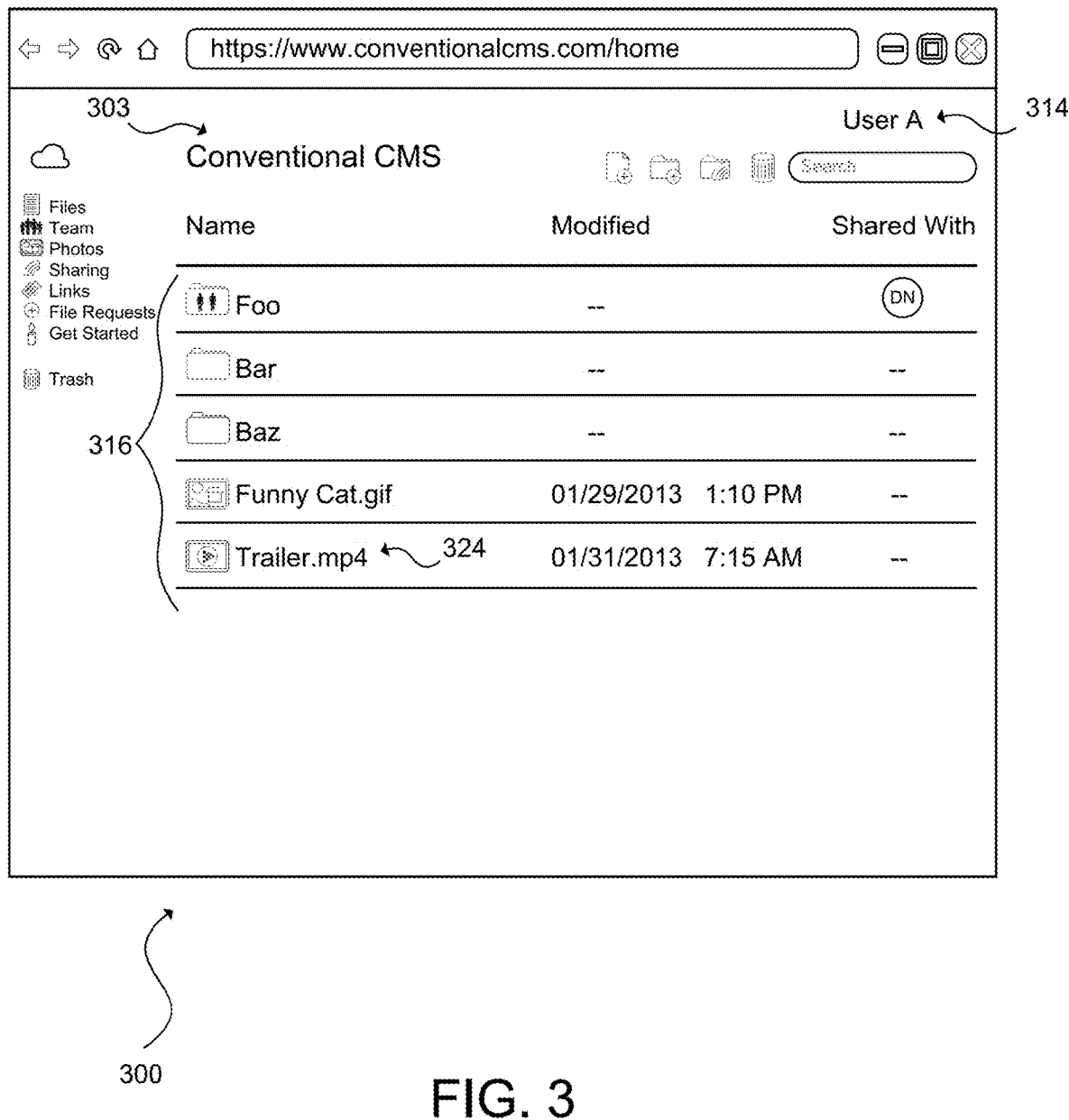
FIG. 3 shows an example web interface for re-associating a local content item on a client device with a removed content item of a conventional content management system.

FIG. 3 shows an example web interface 300 of a user account of conventional content management system 303.

Upon the relinking of a client device, such as client device 104 previously shown in FIG. 1C, conventional content management system 303 will synchronize local content items on the client device with content items 316 of the user account of user 314. For example, conventional content management system 303 may analyze each of the local content items on the client device and synchronize the local content items 316. If a local content item on the client device corresponds to a previous revision of a content item of the user account, conventional content management system 303 may send information to update the local content item such that the local content item corresponds to the latest revision. If a local content item has a same content path as a content item of the user account but does not correspond to any revision, conventional content management system 303 may perform a conflict resolution procedure to reconcile differences between the local content item and the latest revision of the content item of the user account. If a local content item does not correspond to any existing content item, conventional content management system 303 may retrieve the local content item and distribute the local content item as a new content item of the user account. This approach, however, may not meet users' expectations with respect to the case in which conventional content management system 303 removes a content item from a user account and a relinked client device has not accounted for removal of that content item. As previously discussed, conventional content management system 303 may assume the local content item on the relinked client device is a new content item and distribute the local content item to every authorized client device despite the intention of user 314 or another authorized user to remove the content item. This can be seen in FIG. 3, in which conventional content management system 303 adds content item 324 back to content items 316. Although it can be trivial in this example to re-delete content item 324, this can become burdensome for user 314 to manage in other situations where user 314 must re-delete dozens, hundreds, or thousands of content items. In addition, conventional content management system 303 expends unnecessary processing resources, storage space, and network bandwidth to retrieve local content items on the relinked client device, distributing the local content items to authorized client devices as "new" content items, and re-deleting the "new" content items. This problem increases in scale for every additional user account and every client device authorized under the user account.

Figure 4A:
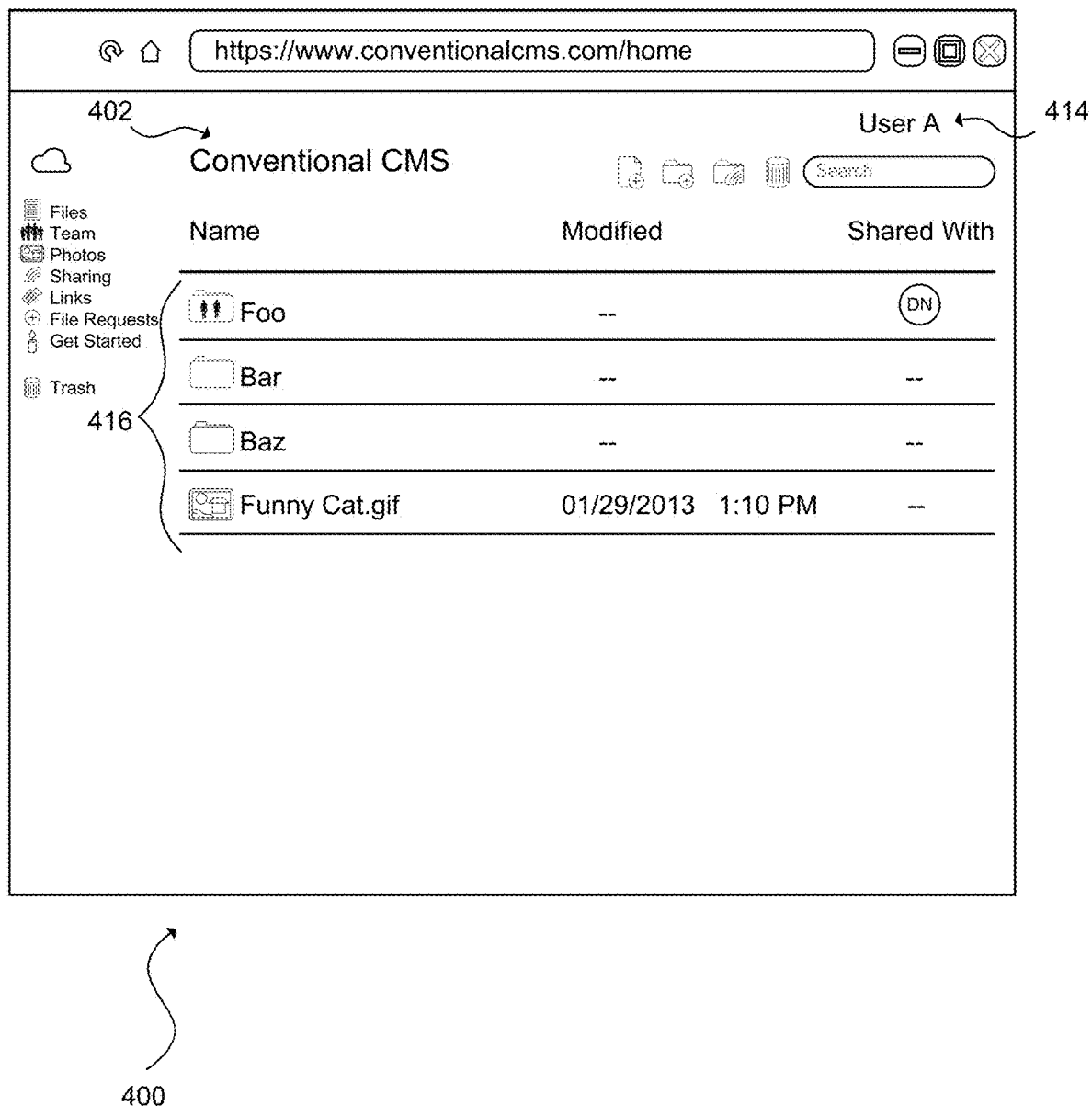
FIGS. 4A and 4B show example client interfaces for re-associating a local content item on a client device with a removed content item of a content management system.

FIG. 4A shows an example web interface 400 of a user account of content management system 402. Here, in contrast to conventional content management system 303, upon the relinking of a client device, such as client device 104 previously shown in FIG. 1C, content management system 402 does not treat local content item 124 as a new content item. Instead, when content management system 402 synchronizes local content items on a relinked client device with content items 416 of the user account of user 414, content management system 402 will "re-associate" removed (e.g., deleted, renamed, moved, etc.) content items. For instance, instead of assuming that a local content item that does not correspond to any existing content item is a new content item, content management system 402 can determine whether the local content item corresponds to a content item that has been deleted (or renamed, moved, etc.). In one example, content management system 402 can maintain a respective revision history for every content item of a user account, including a "deleted" revision. Revision histories can be indexed based on a content path of a content item. Content management system 402 can use the revision histories to determine whether the local content item shares a same content path of a deleted content item. If so, content management system 402 can recognize that the local content item corresponds to a deleted content item and does not attempt to add the local content item as a new content item, as shown in FIG. 4A, which excludes local content item 124 (i.e., Trailers.mp4 as previously shown in FIG. 1C).

Figure 4B:
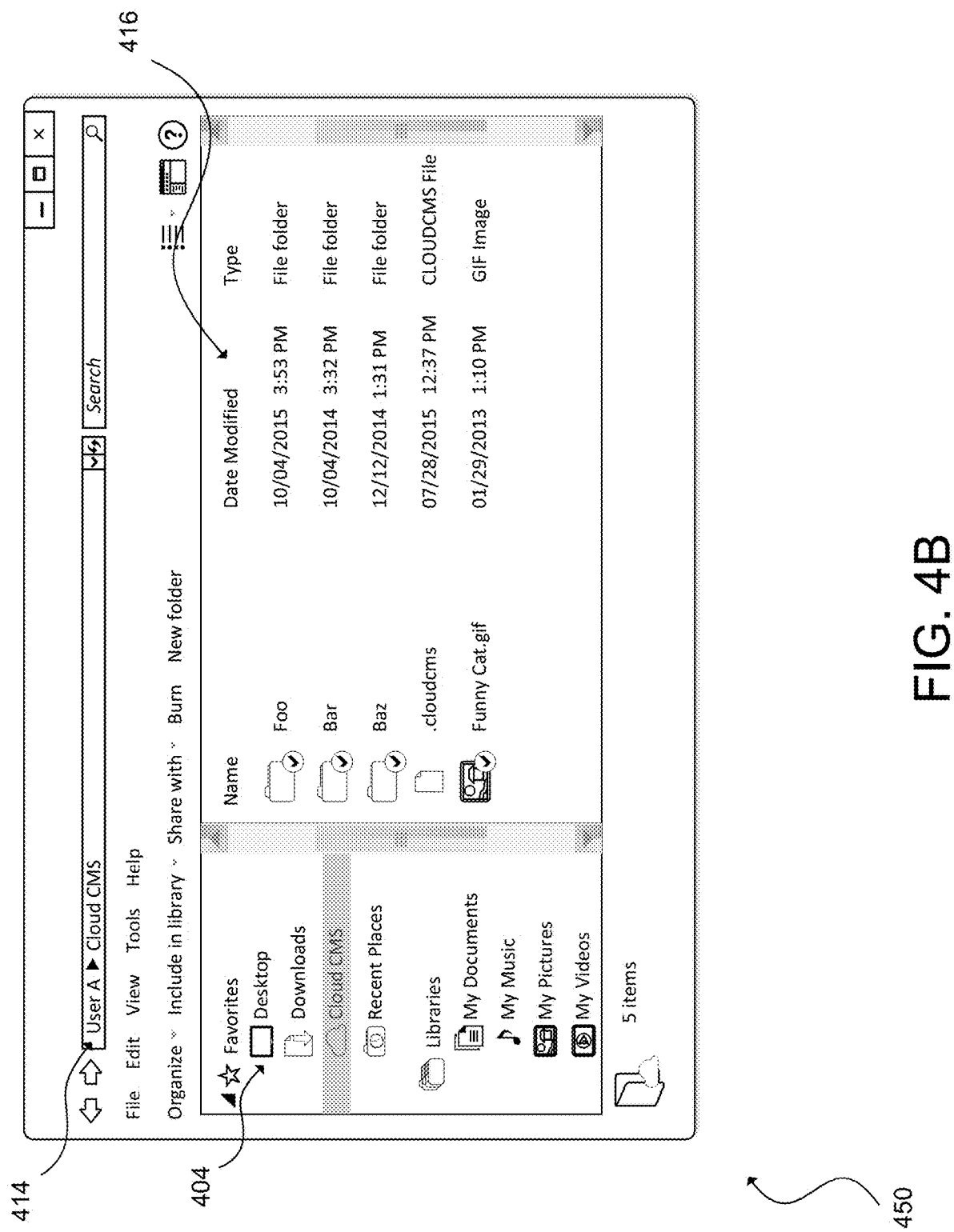

In addition, content management system 402 can delete the local content item from the relinked client device during synchronization, as shown in FIG. 4B. In particular, FIG. 4B shows an example client application interface 450 of client device 404 relinked to content management system 402 (as shown in FIG. 4A). As seen in FIG. 4B, local content items 416 on client device 404 do not include local content item 124 (i.e., Trailers.mp4 as previously shown in FIG. 1C).

Figure 5:
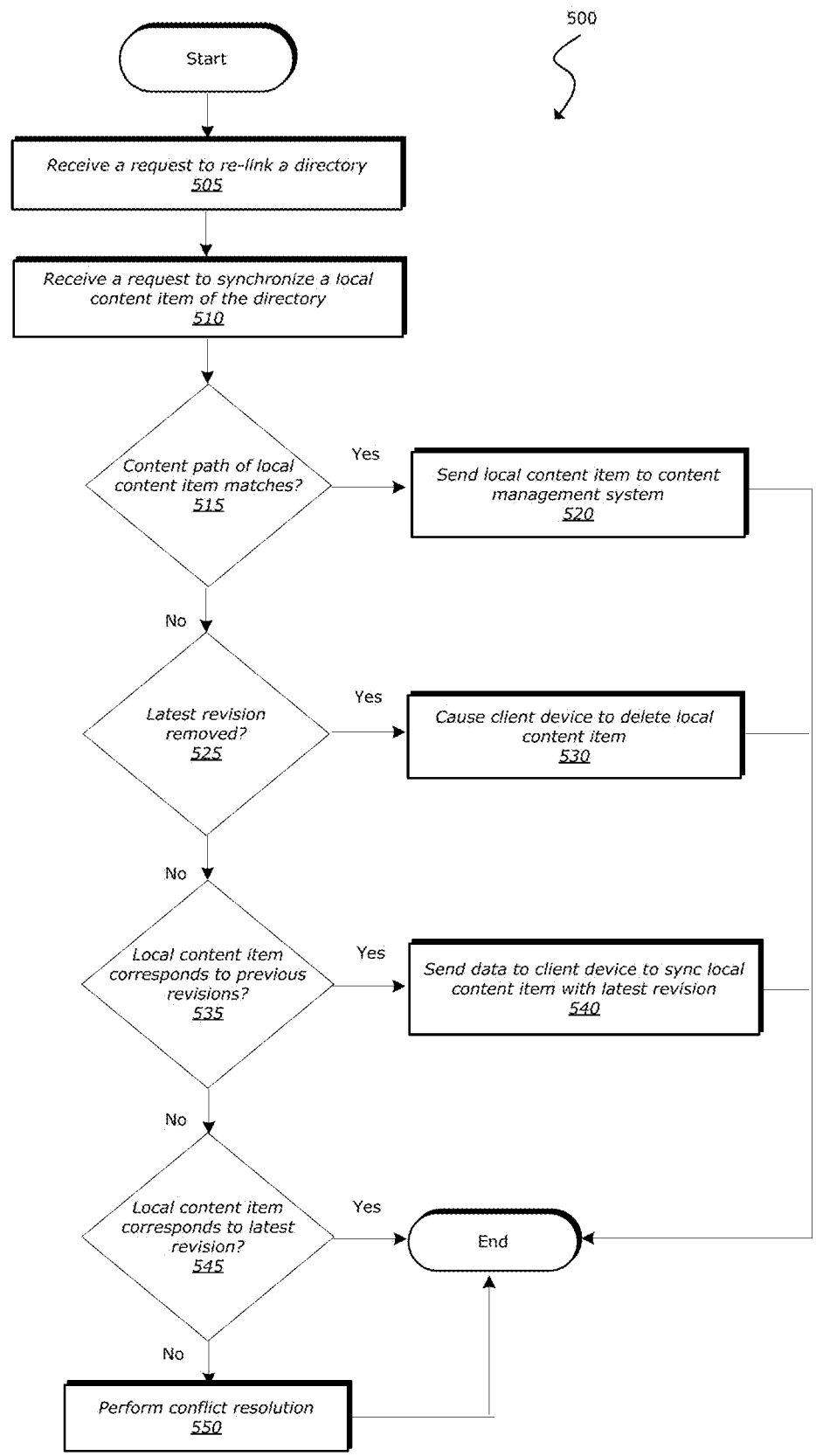
FIG. 5 shows an example flow diagram for re-associating local content items on a client device with content items of a content management system.

The method shown in FIG. 5 is provided by way of example, as there are a variety of ways to carry out the method. Additionally, while the example method is illustrated with a particular order of sequences, those of ordinary skill in the art will appreciate that FIG. 5 and the sequences shown therein can be executed in any order that accomplishes the technical advantages of the present disclosure and can include fewer or more steps than illustrated.

Each sequence shown in FIG. 5 represents one or more processes, methods or subroutines, carried out in the example method. The sequences shown in FIG. 5 can be implemented in a system such as system 600 shown in FIG. 6. The flow chart illustrated in FIG. 5 will be described in relation to and make reference to at least content management system 202 shown in FIGS. 2A and 2B and client device 104 shown in FIGS. 1A, 1B, and 1C.

FIG. 5 shows an example flow diagram 500 for relinking a client device to a content management system, including re-associating local content items stored on the client device with the content items of a user account associated with the content management system. Flow diagram 500 can begin at sequence 505, at which point content management system 202 can receive a request to relink a user account on a client device. The request can be received from client device 104, which was previously linked to the user account. When the request to relink has been received, flow diagram 500 can proceed to sequence 510.

At sequence 510, content management system 202 can receive a request to synchronize local content item 124 (e.g., Trailer.mp4) with a corresponding content item of a user account associated with content management system 202. The request can include a content path of local content item 124 (including any directory or sub-directory in which local content item 124 can be located and a name of local content item 124). In some examples, the request can include one or more hash values of local content item 124. The content path and/or the hash value(s) can be used as a signature or key for local content item 124. When content management system 202 receives the synchronization request, flow diagram 500 can proceed to sequence 515.

At sequence 515, content management system 202 can determine whether the content path of local content item 124 corresponds to any content path of content items of the user account. For example, content management system 202 can use the content path or other data derived from the content path, such as the hash value of the content path, as a key or signature into an index of content paths of content items of the user account of user 114. If there is no match on the key or signature (i.e., the content path of local content item 124 does not correspond to any content path of content items of the user account, including any currently existing content item and any previously existing content item that is cur-rently removed from the user account), local content item 124 is a new item and can be synchronized (e.g., committed) to the user account. In this case, flow diagram 500 can proceed to sequence 520. On the other hand, if there is a match on the key or signature, local content item 124 corresponds to a content item that previously existed or currently exists in the user account, and flow diagram 500 can proceed to sequence 525.

At sequence 520, client device 104 can send local content item 124 to content management system 202 to commit local content item 124 as a new content item for storage under the user account of user 114. When local content item 124 has been committed as a content item of the user account, flow diagram 500 can end.

At sequence 525, content management system 202 can determine whether the content item of the user account corresponding to local content item 124 is currently removed (e.g., deleted, renamed, or moved). For example, user 114 may have deleted the content item corresponding to local content item 124 while client device 104 was unlinked. Thus, a revision history of the corresponding content may indicate that the corresponding content item is currently deleted (e.g., has a file size of 0) from the user account, and flow diagram 500 can proceed to sequence 530. On the other hand, when local content item 124 is not currently deleted from the user account, flow diagram 500 can proceed to sequence 535.

At sequence 530, local content item 124 can be deleted from client device 104 (as shown in FIG. 4B). For example, content management system 202 can send client device 104 instructions to delete local content item 124. As should be understood, if a content item is a directory, content management system 202 can delete any content items in the directory and any subdirectory and subdirectories' content items. When local content item 124 has been deleted, flow diagram 500 can end.

At sequence 535, content management system 202 can determine whether local content item 124 corresponds to any previous revision of the content item of the user account. If local content item 124 corresponds to a previous revision, content management system 202 can synchronize local content item 124 with the latest revision, and flow diagram 500 can proceed to sequence 540. On the other hand, if local content item 124 does not correspond to any previous revision, flow diagram 500 can proceed to sequence 545.

At sequence 540, content management system can send data to client device 104 to synchronize local content item 124 with the latest revision of the user account. When local content item is updated to correspond to the latest revision of the content item of the user account, flow diagram 500 can end.

At sequence 545, content management system 202 can determine whether local content item 124 corresponds to the latest revision of the content item of the user account. If local content item 124 corresponds to the latest revision, client device 104 has the most up to date version of the content item, content management system 202 does not need to perform any additional action with respect to local content item 124, and flow diagram 500 can end. On the other hand, if local content item 124 does not correspond to the latest revision, local content item includes updates never processed by content management 202, and flow diagram 500 can proceed to sequence 550.

At sequence 550, content management system 202 can perform a conflict resolution procedure to reconcile differences between local content item 124 and the latest revision of the content item of the user account. In some examples, this can require manual intervention on the part of a user to determine which updates to incorporate. When differences between local content item 124 and the latest revision of the content item are reconciled, flow diagram 500 can end.

With respect to implementing various embodiments of the disclosed technology, an example system configuration 600 is shown in FIG. 6, wherein electronic devices communicate via a network for purposes of exchanging content and other data. The system can be configured for use on a wide area network such as that illustrated in FIG. 6. However, the present principles are applicable to a wide variety of network configurations that facilitate the intercommunication of electronic devices. For example, each of the components of system 600 in FIG. 6 can be implemented in a localized or distributed fashion in a network.

In system 600, a user can interact with content management system 606 through client devices $604_1$, $604_2$, ..., $604_n$ (collectively "604") connected to network 606 by direct and/or indirect communication. Content management system 602 can support connections from a variety of different client devices, such as desktop computers; mobile computers; mobile communications devices, e.g. mobile phones, smart phones, tablets; smart televisions; set-top boxes; and/or any other network enabled computing devices. Client devices 604 can be of varying type, capabilities, operating systems, etc. Furthermore, content management system 602 can concurrently accept connections from and interact with multiple client devices 604.

A user can interact with content management system 602 via a client-side application installed on client device $604_i$. In some embodiments, the client-side application can include a content management system specific component. For example, the component can be a stand-alone application, one or more application plug-ins, and/or a browser extension. However, the user can also interact with content management system 602 via a third-party application, such as a web browser, that resides on client device $604_i$ and is configured to communicate with content management system 602. In either case, the client-side application can present a user interface (UI) for the user to interact with content management system 602. For example, the user can interact with the content management system 602 via a client-side application integrated with the file system or via a webpage displayed using a web browser application.

Content management system 602 can make it possible for a user to store content, as well as perform a variety of content management tasks, such as retrieve, modify, browse, and/or share the content. Furthermore, content management system 602 can make it possible for a user to access the content from multiple client devices 604. For example, client device $602_i$ can upload content to content management system 602 via network 606. The content can later be retrieved from content management system 602 using the same client device $604_i$ or some other client device $604_j$.

To facilitate the various content management services, a user can create an account with content management system 602. The account information can be maintained in user account database 614. User account database 614 can store profile information for registered users. In some cases, the only personal information in the user profile can be a username and/or email address. However, content management system 606 can also be configured to accept additional user information.

User account database 614 can also include account management information, such as account type, e.g. free or paid; usage information, e.g. file edit history; maximum storage space authorized; storage space used; content storage locations; security settings; personal configuration settings; content sharing data; etc. Account management module 612 can be configured to update and/or obtain user account details in user account database 614. The account management 612 can be configured to interact with any number of other modules in content management system 602.

An account can be used to store content, such as digital data, documents, text files, audio files, video files, etc., from one or more client devices 604 authorized on the account. The content can also include directories or other mechanisms of grouping content items together with different behaviors, such as collections, playlists, albums, etc. For example, an account can include a public directory that is accessible to any user. The public directory can be assigned a web-accessible address. A link to the web-accessible address can be used to access the contents of the public directory. In another example, an account can include a photos directory that is intended for photos and that provides specific attributes and actions tailored for photos; an audio directory that provides the ability to play back audio files and perform other audio related actions; or other special purpose directories. An account can also include shared directories or group directories that are linked with and available to multiple user accounts. The permissions for multiple users can be different for a shared directory.

The content can be stored in content storage 616. Content storage 616 can be a storage device, multiple storage devices, or a server. Alternatively, content storage 616 can be a cloud storage provider or network storage accessible via one or more communications networks. Content management system 602 can hide the complexity and details from client devices 604 so that client devices 604 do not need to know exactly where the content items are being stored by content management system 606. In one variation, content management system 602 can store the content items in the same directory hierarchy as they appear on client device $604_i$. However, content management system 602 can store the content items in its own order, arrangement, or hierarchy. Content management system 602 can store the content items in a network accessible storage (SAN) device, in a redundant array of inexpensive disks (RAID), etc. Content storage 660 can store content items using one or more partition types, such as FAT, FAT32, NTFS, EXT2, EXT3, EXT4, ReiserFS, BTRFS, and so forth.

Content storage 616 can also store metadata describing content items, content item types, and the relationship of content items to various accounts, directories, or groups. The metadata for a content item can be stored as part of the content item or can be stored separately. In one variation, each content item stored in content storage 160 can be assigned a system-wide unique identifier.

Content storage 616 can decrease the amount of storage space required by identifying duplicate files or duplicate segments of files. Instead of storing multiple copies, content storage 616 can store a single copy and then use a pointer or other mechanism to link the duplicates to the single copy. Similarly, content storage 616 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 602 can be configured to support automatic synchronization of content from one or more client devices 604. The synchronization can be platform agnostic. That is, the content can be synchronized across multiple client devices 604 of varying type, capabilities, operating systems, etc. For example, client device 604$_i$ can include client software, which synchronizes, via a synchronization module 618 at content management system 602, content in client device 604$_i$'s file system with the content in an associated user account. In some cases, the client software can synchronize any changes to content in a designated directory and its sub-directories, such as new, deleted, modified, copied, or moved files or directories. The client software can be a separate software application, can integrate with an existing content management application in the operating system, or some combination thereof. In one example of client software that integrates with an existing content management application, a user can manipulate content directly in a local directory, while a background process monitors the local directory for changes and synchronizes those changes to content management system 602. Conversely, the background process can identify content that has been updated at content management system 602 and synchronize those changes to the local directory. The client software can provide notifications of synchronization operations, and can provide indications of content statuses directly within the content management application. Sometimes client device 602$_i$ may not have a network connection available. In this scenario, the client software can monitor the linked directory for file changes and queue those changes for later synchronization to content management system 602 when a network connection is available. Similarly, a user can manually stop or pause synchronization with content management system 602.

A user can also view or manipulate content via a web interface generated and served by user interface module 620. For example, the user can navigate in a web browser to a web address provided by content management system 602. Changes or updates to content in the content storage 616 made through the web interface, such as uploading a new version of a file, can be propagated back to other client devices 604 associated with the user's account. For example, multiple client devices 604, each with their own client software, can be associated with a single account and files in the account can be synchronized between each of the multiple client devices 604.

Content management system 602 can include a communications interface 608 for interfacing with various client devices 604, and can interact with other content and/or service providers 608$_1$, 608$_2$, . . . , 608$_n$ (collectively "608") via an Application Programming Interface (API). Certain software applications can access content storage 616 via an API on behalf of a user. For example, a software package, such as an app on a smartphone or tablet computing device, can programmatically make calls directly to content management system 602, when a user provides credentials, to read, write, create, delete, share, or otherwise manipulate content. Similarly, the API can allow users to access all or part of content storage 616 through a web site.

Content management system 602 can also include authenticator module 622, which can verify user credentials, security tokens, API calls, specific client devices, and so forth, to ensure only authorized clients and users can access files. Further, content management system 602 can include analytics module 624 module that can track and report on aggregate file operations, user actions, network usage, total storage space used, as well as other technology, usage, or business metrics. A privacy and/or security policy can prevent unauthorized access to user data stored with content management system 602.

Content management system 602 can include sharing module 626 for managing sharing content publicly or privately. Sharing content publicly can include making the content item accessible from any computing device in network communication with content management system 602. Sharing content privately can include linking a content item in content storage 616 with two or more user accounts so that each user account has access to the content item. The sharing can be performed in a platform agnostic manner. That is, the content can be shared across multiple client devices 604 of varying type, capabilities, operating systems, etc. The content can also be shared across varying types of user accounts.

In some embodiments, content management system 602 can be configured to maintain a content directory identifying the location of each content item in content storage 616. The content directory can include a unique content entry for each content item stored in the content storage.

A content entry can include a content path that can be used to identify the location of the content item in a content management system. For example, the content path can include the name of the content item and a directory hierarchy associated with the content item. For example, the content path can include a directory or path of directories in which the content item is placed as well as the name of the content item. Content management system 602 can use the content path to present the content items in the appropriate directory hierarchy.

A content entry can also include a content pointer that identifies the location of the content item in content storage 616. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 626 can be configured to add a user account identifier to the content entry associated with the content item, thus granting the added user account access to the content item. Sharing module 626 can also be configured to remove user account identifiers from a content entry to restrict a user account's access to the content item.

To share content publicly, sharing module 626 can be configured to generate a custom network address, such as a uniform resource locator (URL), which allows any web browser to access the content in content management system 602 without any authentication. To accomplish this, sharing module 626 can be configured to include content identification data in the generated URL, which can later be used to properly identify and return the requested content item. For example, sharing module 626 can be configured to include the user account identifier and the content path in the generated URL. Upon selection of the URL, the content identification data included in the URL can be transmitted to content management system 602 which can use the received content identification data to identify the appropriate content entry and return the content item associated with the content entry.

In addition to generating the URL, sharing module 626 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 626 can be configured to change the value of the flag to 1 or true after generating a URL to the content item.

In some embodiments, sharing module 626 can also be configured to deactivate a generated URL. For example, each content entry can also include a URL active flag indicating whether the content should be returned in response to a request from the generated URL. For example, sharing module 626 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 626 can reactivate the URL by again changing the value of the URL active flag to 1 or true. A user can thus easily restore access to the content item without the need to generate a new URL.

While content management system 602 is presented with specific components, it should be understood by one skilled in the art, that the architectural configuration of system 606 is simply one possible configuration and that other configurations with more or less components are also possible.

Figure 7A:
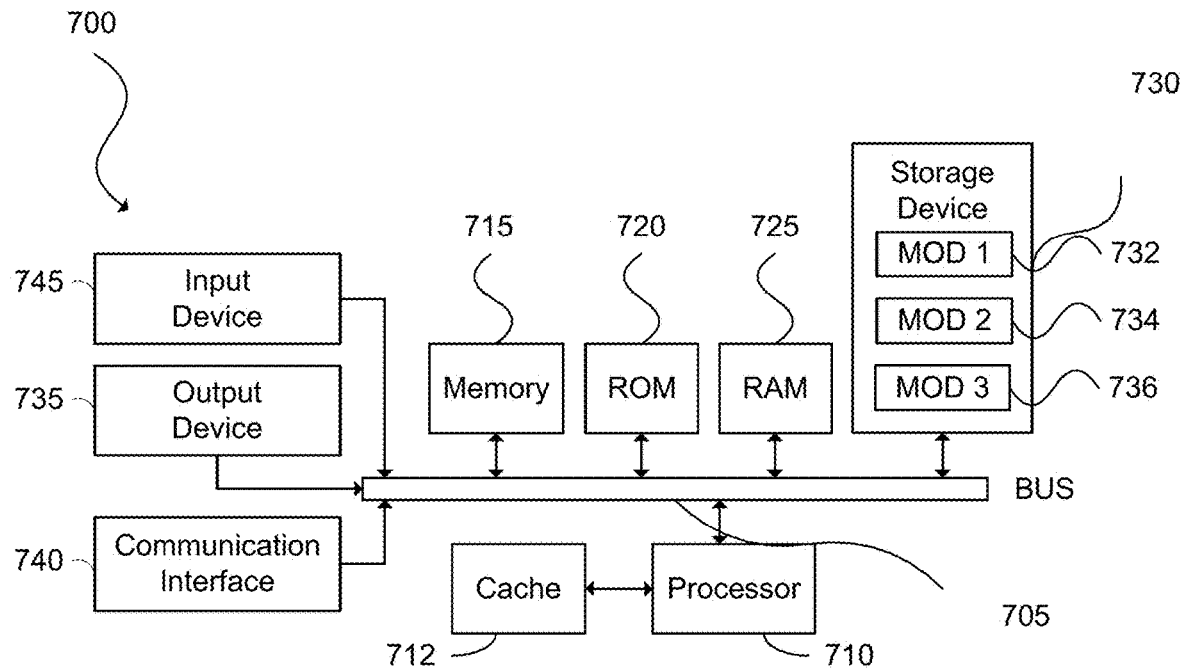
FIG. 7A shows a first example system embodiment for implementing various embodiments of the present technology.
Figure 7B:
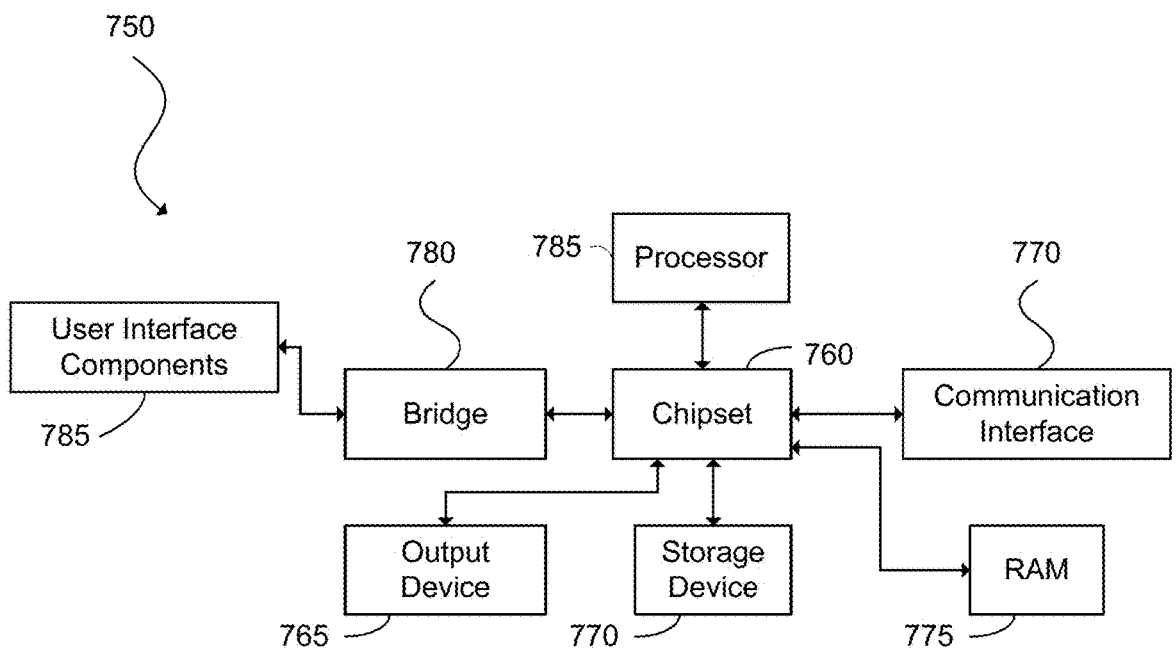
FIG. 7B shows a second example system embodiment for implementing various embodiments of the present technology.

FIG. 7A and FIG. 7B show example possible system embodiments. The more appropriate embodiment will be apparent to those of ordinary skill in the art when practicing the present technology. Persons of ordinary skill in the art will also readily appreciate that other system embodiments are possible.

FIG. 7A illustrates a conventional system bus computing system architecture 700 wherein the components of the system are in electrical communication with each other using a bus 705. Example system 700 includes a processing unit (CPU or processor) 710 and a system bus 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 can be available for use as well. The memory 715 can include multiple different types of memory with different performance characteristics. The processor 710 can include any general purpose processor and a hardware module or software module, such as module 1 732, module 2 734, and module 3 736 stored in storage device 730, configured to control the processor 710 as well as a special-purpose processor where software instructions are incorporated into the actual processor design. The processor 710 can essentially be a completely self-contained computing system, containing multiple cores or processors, a bus, memory controller, cache, etc. A multi-core processor can be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here can easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include software modules 732, 734, 736 for controlling the processor 710. Other hardware or software modules are contemplated. The storage device 730 can be connected to the system bus 705. In one aspect, a hardware module that performs a particular function can include the software component stored in a computer-readable medium in connection with the necessary hardware components, such as the processor 710, bus 705, display 735, and so forth, to carry out the function.

FIG. 7B illustrates a computer system 750 having a chipset architecture that can be used in executing the described method and generating and displaying a graphical user interface (GUI). Computer system 750 is an example of computer hardware, software, and firmware that can be used to implement the disclosed technology. System 750 can include a processor 755, representative of any number of physically and/or logically distinct resources capable of executing software, firmware, and hardware configured to perform identified computations. Processor 755 can communicate with a chipset 760 that can control input to and output from processor 755. In this example, chipset 760 outputs information to output 765, such as a display, and can read and write information to storage device 770, which can include magnetic media, and solid state media, for example. Chipset 760 can also read data from and write data to RAM 775. A bridge 780 for interfacing with a variety of user interface components 785 can be provided for interfacing with chipset 760. Such user interface components 785 can include a keyboard, a microphone, touch detection and processing circuitry, a pointing device, such as a mouse, and so on. In general, inputs to system 750 can come from any of a variety of sources, machine generated and/or human generated.

Chipset 760 can also interface with one or more communication interfaces 790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 755 analyzing data stored in storage 770 or 775. Further, the machine can receive inputs from a user via user interface components 785 and execute appropriate functions, such as browsing functions by interpreting these inputs using processor 755.

It can be appreciated that example systems 700 and 750 can have more than one processor 710 or be part of a group or cluster of computing devices networked together to provide greater processing capability.

For clarity of explanation, in some instances the present technology can be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions can be, for example, binaries, intermediate format instructions such as assembly language, firmware, or source code. Examples of computer-readable media that can be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer implemented method comprising:
    receiving, at a content management system, a request to relink a previously linked client device with a user account at the content management system;
    in response to the request to relink the client device, relinking the client device with the content management system;
    determining a local version of a content item on the client device corresponds to a content management system version of the content item in the user account, the content item is identified in a revision history of the content item associated with the user account, and wherein a hash value derived from the content management system version of the content item in the user account is different than a hash value derived from the local version of the content item; and
    causing the client device to synchronize the local version of the content item with the content management system version of the content item to yield a common synchronized version of the content item at the client device and the content management system.

2. The computer implemented method of claim 1, wherein the revision history includes a signature of the content management system version of the content item that is compared to a signature of the local version of the content item.

3. The computer implemented method of claim 2, wherein the signature of the local version of the content item includes the hash value derived from the local version of the content item.

4. The computer implemented method of claim 1, wherein the causing the client device to synchronize the local version of the content item comprises sending data to update the local version of the content item to match the content management system version, whereby both the content item and the content management system will store the common synchronized version of the content item.

5. The computer implemented method of claim 1, further comprising:
    determining a second content item on the client device has a content path that does not correspond to content paths of content items of the user account at the content management system; and
    receiving the second content item from the client device.

6. The computer implemented method of claim 1, further comprising:
    determining a local version of a second content item on the client device does not correspond to a content management system version of the second content item; and
    performing a conflict resolution to reconcile differences in the local version of the second content item and the content management system version of the second content item.

7. The computer implemented method of claim 1, further comprising:
    before receiving the request to relink the client device, receiving, at the content management system from a second client device authorized on the user account, a request to delete a second content item; and in response to relinking the client device with the content management system, deleting the second content item from the client device.

8. A non-transitory computer-readable medium storing instructions that, upon being executed by a computer, cause the computer to:
receive, at a content management system, a request to relink a previously linked client device with a user account at the content management system;
in response to the request to relink the client device, relink the client device with the content management system;
determine a local version of a content item on the client device corresponds to a content management system version of the content item in the user account, wherein the content item is identified in a revision history of the content item associated with the user account, and wherein a hash value derived from the content management system version of the content item in the user account is different than a hash value derived from the local version of the content item; and
cause the client device to synchronize the local version of the content item with the content management system version of the content item to yield a common synchronized version on the content item at the client device and a content management system.

9. The non-transitory computer-readable medium of claim 8, wherein the revision history includes a signature of the content management system version of the content item that is compared to a signature of the local version of the content item.

10. The non-transitory computer-readable medium of claim 9, wherein the signature of the local version of the content item includes the hash value derived from the local version of the content item.

11. The non-transitory computer-readable medium of claim 8, wherein the instructions upon being executed further cause the computer to send data to update the local version of the content item to match the content management system version, whereby both the content item and the content management system will store the common synchronized version of the content item.

12. The non-transitory computer-readable medium of claim 8, wherein the instructions upon being executed further cause the computer to:
determine a second content item on the client device has a content path that does not correspond to content paths of content items of the user account at the content management system; and
receive the second content item from the client device.

13. The non-transitory computer-readable medium of claim 8, wherein the instructions upon being executed further cause the computer to:
determine a local version of a second content item on the client device does not correspond to a content management system version of the second content item; and
perform a conflict resolution to reconcile differences in the local version of the second content item and the content management system version of the second content item.

14. The non-transitory computer-readable medium of claim 8, wherein the instructions upon being executed further cause the computer to:
before receiving the request to relink the client device, receive, from a second client device authorized on the user account, a request to delete a second content item; and in response to relinking the client device with the content management system, delete the second content item from the client device.

15. A content management system comprising:
one or more processors; and
memory including instructions that, upon being executed by the one or more processors, cause the content management system to:
receive, at the content management system, a request to relink a previously linked client device with a user account at the content management system;
in response to the request to relink the client device, relink the client device with the content management system;
determine a local version of a content item on the client device corresponds to a content management system version of the content item of the user account, wherein the content item is identified in a revision history of the content item associated with the user account, and wherein a hash value derived from the content management system version of the content item in the user account is different than a hash value derived from the local version of the content item; and
cause the client device to synchronize the local version of the content item with the content management system version of the content item to yield a common synchronized version on the content item at the client device and a content management system.

16. The content management system of claim 15, wherein the instructions upon being executed further cause the content management system to:
determine a signature of the local version of the content item; and
compare the signature of the local version of the content item to a signature of the content management system version of the content item.

17. The content management system of claim 16, wherein the signature of the local version of the content item includes the hash value derived from the local version of the content item.

18. The content management system of claim 15, wherein the instructions upon being executed further cause the content management system to send data to update the local version of the content item to match the content management system version, whereby both the content item and the content management system will store the common synchronized version of the content item.

19. The content management system of claim 15, wherein the instructions upon being executed further cause the content management system to:
determine a second content item on the client device has a content path that does not correspond to content paths of content items of the user account at the content management system; and
receive the second content item from the client device.

20. The content management system of claim 15, wherein the instructions upon being executed further cause the content management system to:
determine a local version of a second content item on the client device does not correspond to a content management system version of the second content item; and
perform a conflict resolution to reconcile differences in the local version of the second content item and the content management system version of the second content item.

* * * * *